US007062175B2

(12) United States Patent
Stevenson et al.

(10) Patent No.: US 7,062,175 B2
(45) Date of Patent: Jun. 13, 2006

(54) REPEATING RADIO FREQUENCY TRANSMISSION SYSTEM FOR EXTENDING THE EFFECTIVE OPERATIONAL RANGE OF AN INFRARED REMOTE CONTROL SYSTEM

(75) Inventors: George E. Stevenson, Seattle, WA (US); Leslie Alan Leech, Kowloon (HK); James R. W. Phillips, Bellevue, WA (US)

(73) Assignee: X10 Wireless Technology, Inc., Seattle, WA (US)

( * ) Notice: Subject to any disclaimer, the term of this patent is extended or adjusted under 35 U.S.C. 154(b) by 1148 days.

(21) Appl. No.: 09/839,531

(22) Filed: Apr. 19, 2001

(65) Prior Publication Data

US 2002/0154024 A1 Oct. 24, 2002

(51) Int. Cl.
*H04B 10/00* (2006.01)
*H04B 10/02* (2006.01)

(52) U.S. Cl. ........................ 398/115; 398/106; 398/175

(58) Field of Classification Search ................ 398/115, 398/116, 175, 176, 106, 107, 111; 370/535–537; 455/7, 3.03, 10, 11.1, 13.3, 15, 20, 22, 74, 455/83, 151.2, 511
See application file for complete search history.

(56) References Cited

U.S. PATENT DOCUMENTS

| | | | | |
|---|---|---|---|---|
| 4,809,359 | A | 2/1989 | Dockery | 455/603 |
| 4,897,883 | A * | 1/1990 | Harrington | 398/126 |
| 5,142,397 | A | 8/1992 | Dockery | 359/145 |
| 5,227,780 | A | 7/1993 | Tigwell | 340/825.72 |
| 5,383,044 | A * | 1/1995 | Borchardt et al. | 398/111 |
| 6,359,714 | B1 * | 3/2002 | Imajo | 398/178 |
| 6,407,779 | B1 * | 6/2002 | Herz | 348/734 |

* cited by examiner

*Primary Examiner*—Jason Chan
*Assistant Examiner*—Dalzid Singh
(74) *Attorney, Agent, or Firm*—Black Lowe & Graham, PLLC

(57) ABSTRACT

Inventive systems and methods for remotely controlling infrared controlled devices by using addressed radio frequency control signals. Radio frequency signals propagate through most obstructions to infrared control signals. Augmenting each control signal with an address allows for great selectivity in an environment with several transmitters and receivers.

36 Claims, 8 Drawing Sheets

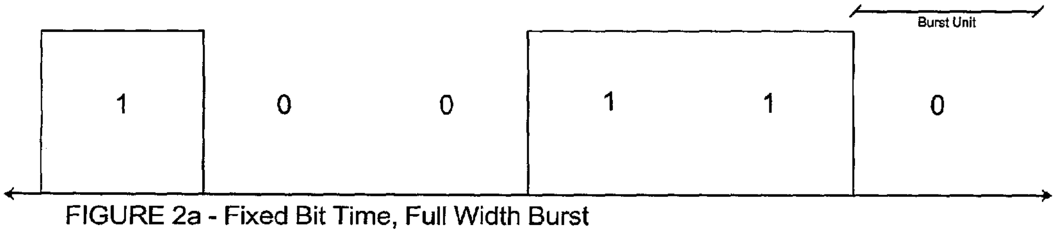

FIGURE 2a - Fixed Bit Time, Full Width Burst

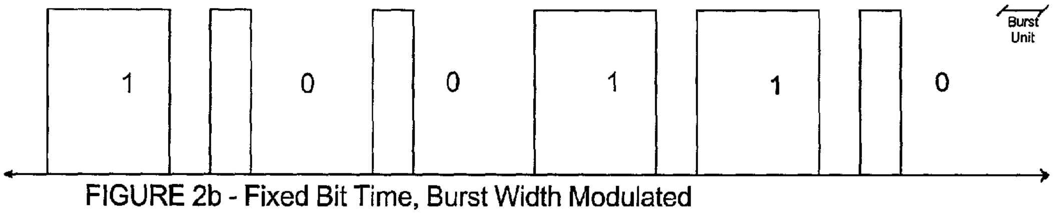

FIGURE 2b - Fixed Bit Time, Burst Width Modulated

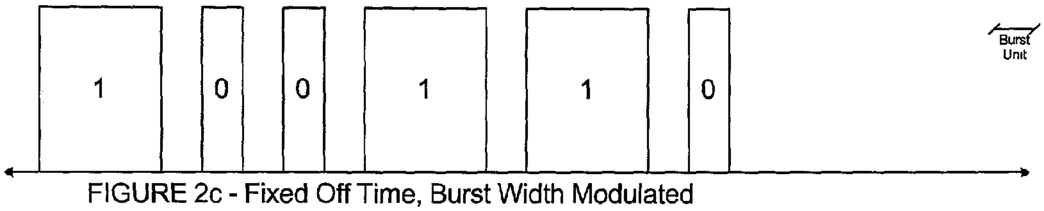

FIGURE 2c - Fixed Off Time, Burst Width Modulated

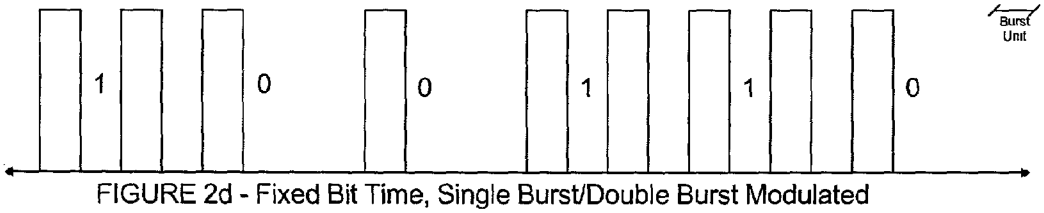

FIGURE 2d - Fixed Bit Time, Single Burst/Double Burst Modulated

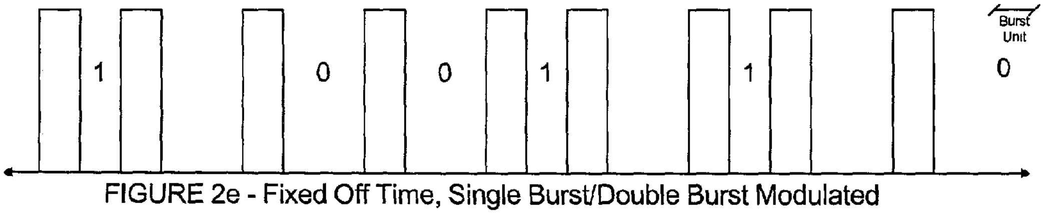

FIGURE 2e - Fixed Off Time, Single Burst/Double Burst Modulated

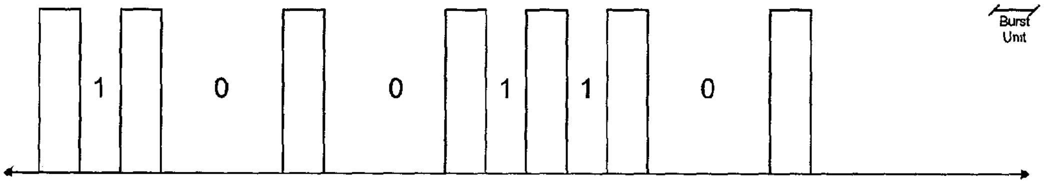

FIGURE 2f - Fixed Burst Time, Off Time Modulated

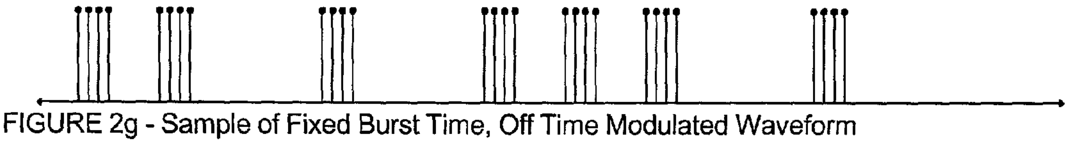

FIGURE 2g - Sample of Fixed Burst Time, Off Time Modulated Waveform

Figure 5
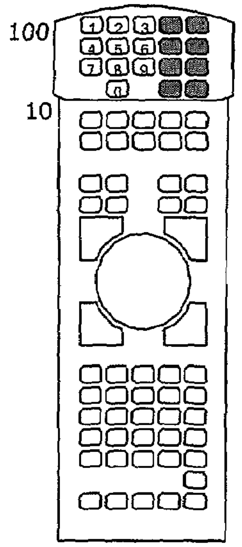
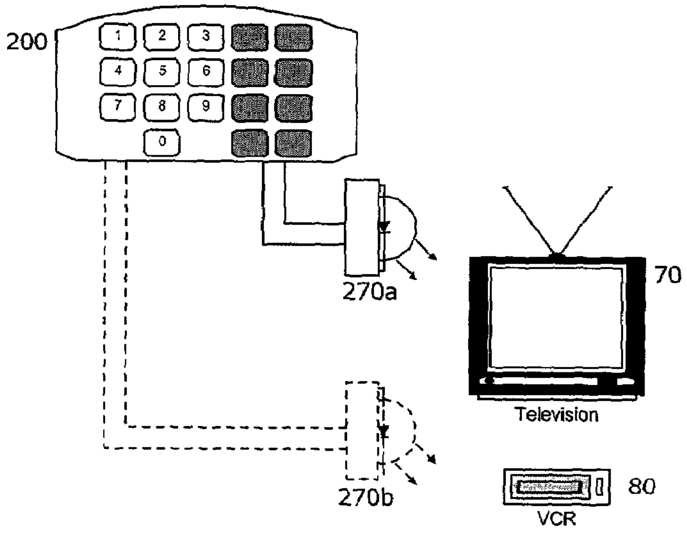
Figure 6

REPEATING RADIO FREQUENCY TRANSMISSION SYSTEM FOR EXTENDING THE EFFECTIVE OPERATIONAL RANGE OF AN INFRARED REMOTE CONTROL SYSTEM

FIELD OF THE INVENTION

The present invention relates to a method and a system of extending the effective operating range and selectivity of an infrared remote control system of the type used with audio and video equipment.

BACKGROUND OF THE INVENTION

One of the pervasive features of consumer audio and video electronic components in recent years has been and continues to be the handheld remote control. The handheld remote control sends control signals to the controlled device by irradiating the device with infrared energy generated by infrared photo emitter diodes. The controlled device receives a pattern of intermittent irradiation or illumination comprising a control signal.

The remote control unit has stored patterns corresponding to push buttons assigned to various functions of the controlled device. Activating a button causes the excitation of the photo emitter diode according to the stored pattern, thereby generating and transmitting a control signal. Control signals tend to be short words of data representing a low order numeric signal corresponding to some function of the controlled electronic appliance. Conventionally, infrared (IR) remote control units use a carrier frequency of between 10 kHz and 75 kHz. The controlled device receives the signal with a photo detection diode and circuitry that interprets as logical lows and highs the alternating illumination of the photo emitter diode on the remote control unit. Such a signal corresponds to the pattern stored in the remote control unit.

Various manufacturers have selected unique numeric codes to control their devices. This unique coding has allowed differentiation between such devices. For instance, a Brand X VCR will have a limited vocabulary of signals that influence its action. The Brand Y television will have a different limited vocabulary of signals. If a signal is not present within a device's vocabulary, the device will do nothing. With several devices, each having a distinct and limited vocabulary, a single universal remote control can control all of them, distinctly.

While infrared transmission of control signals is an inexpensive and reliable means of controlling one or more devices, it suffers from several shortcomings. The remote control unit transmits much as a flashlight illuminates. All transmissions propagate strictly along lines of sight. If walls, enclosures, furniture, or people block the path between the remote control unit and the controlled device, the controlled signal is occluded and the device cannot respond. A VCR in a cabinet enclosure will not respond.

Further, as in an auditorium or restaurant, if several of the same brand and model of device are present, a single signal might affect a plurality of those devices present. As only those of the units that the remote control unit illuminates by the emission of its photo emitter diode will receive the signal, the number of units that respond may not always be uniform or predictable.

In U.S. Pat. No. 4,809,359, issued Feb. 28, 1989, and U.S. Pat. No. 5,142,397, issued Aug. 25, 1992, the inventor Dockery teaches a system for extending the range of an infrared remote control system. The system comprises two units known as repeaters. The first repeater receives the infrared control signal from the handheld remote control unit and translates that signal to a corresponding UHF radio frequency signal. The second repeater, located remotely from the first and adjacent to the controlled device, receives the UHF signal and reconstitutes it into an infrared control signal equal to that the handheld remote control unit sent to the first repeater. The controlled device then receives it and responds just as it would to the handheld remote control unit.

The advantage to the Dockery system is that it teaches a signal that will pass through obstructions. The handheld remote control and first repeater of the Dockery patent can control a VCR and second repeater entirely enclosed within a cabinet or even in a second room. Such a system of repeaters allows for a home entertainment system that is inconspicuous within a room or a centrally wired programming center that is remote from the television unit.

The Dockery teaching has several disadvantages however. Principal among those disadvantages is the lack of selectivity. The infrared remote control device will transmit only within a single room and within that room only to those devices illuminated by the photo emitter diode. The first repeater in Dockery's patent, on the other hand, will transmit through walls and other structures. In a home, apartment building, or other area with multiple repeater sets present, one first repeater can be in signal communication with several of the second repeater units. This "crosstalk" between signal units may result in the unintended control of several controlled devices, especially devices outside of the presence of the viewer or listener.

SUMMARY OF THE INVENTION

The instant invention provides a system and a method of addressably transmitting RF control signals to an addressed receiver for controlling IR controlled devices. Rather than to simply transmit an unqualified signal interpretable by all receivers in signal proximity to the transmitter apparatus, as with the Dockery system, the instant invention embeds an address into the RF signal within the transmitter apparatus. Only those receiver apparatuses that recognize the embedded address within the signal will respond.

The system of the present invention comprises a transmitter that receives the infrared control signal from the handheld remote control unit and converts that signal into an electronic or digital signal, adds an address to that signal, and converts that signal into an RF signal. A receiver receives the RF signal and examines the signal for the presence of the address; if the address is present, it strips the address from the signal; converts that signal to an infrared control signal, and transmits the infrared control signal to the controlled device. The transmitted infrared control signal thus mimics that initially received by the transmitter unit.

The transmitter includes a photo detector diode that receives infrared control signals from the handheld remote control unit supplied with the controlled device. Several configurations of the transmitter will serve the inventive purposes of this invention. In one embodiment, the transmitter mounts on the handheld remote control unit in a manner that places the photo detector diode in close proximity and signal communication with the IR transmitting diode on the handheld remote control. The transmitter alternately may stand-alone but be in close proximity to the viewer or listener as they operate the handheld remote control, aiming it at the stand-alone device.

In yet another configuration, the transmitter is able to "learn" infrared control signals in the manner taught by Tigwell in U.S. Pat. No. 5,227,780. In such a configuration, the viewer or listener programs the transmitter unit by placing that unit in close proximity to the handheld remote control. The viewer or listener then selectively activates functions of the handheld remote control unit while the transmitter is in a receptive state to "learn"the corresponding function. The received IR signal is then stored in association with that function within the transmitter. When the viewer or listener then wishes to activate that function on the controlled device, the viewer or listener activates the corresponding buttons on the transmitter unit. The transmitter then treats the stored signal associated with the function as though the transmitter had just received the control signal.

Still further, an RF remote is provided to send the RF signals to a receiver in proximity with the controlled device. The receiver then converts the received RF signals into IR signals that are understood by the controlled device.

Once the transmitter receives an infrared control signal, it stores that signal in electronic form in a buffer. The transmitter then augments the signal with a stored digital signal that serves to identify the transmitter or controlled device. In its augmented form, the transmitter sends the RF signal to the RF receiver. The transmitter might have one or a plurality of stored digital identification signals. Where a plurality exists, the viewer or listener may actively select the identification signal to augment the stored control signal.

The receiver remains in a constant receptive state. When the receiver receives any radio frequency signal, it examines that signal for the presence of the digital identification signal stored within the receiver apparatus. Once the receiver receives that signal and recognizes the stored identification code, the receiver strips the code from the signal; converts the rest of the signal to an IR signal, and transmits that IR signal to the controlled device.

In accordance with further aspects of the invention, the invention differentiates the intended receiver from a plurality of receiver apparatuses, each of which has an identification code distinct from that stored in the intended receiver. These aspects of the invention allow its non-interactive operation in an environment filled by a plurality of transmitter apparatus/receiver pairs.

In accordance with other aspects of the invention, two remote receiver apparatuses with the same stored identification code would control distinct devices in locations remote from each other. For example, a single operator might have a satellite receiver feeding programs to several television sets in several rooms. The operator can control the satellite receiver at each of the television sites using one receiver to control the television and a second receiver to control the remotely located satellite receiver.

BRIEF DESCRIPTION OF THE DRAWINGS

The preferred embodiment of the present invention is described in detail below with reference to the following drawings.

FIG. 2 depicts the various methods used to modulate IR control signals in commercially available controlled devices;

FIG. 5 depicts a preferred installation of the transmitting unit onto a standard remote control;

FIG. 6 depicts a receiver in communicative interaction with two possible controlled electronic devices;

DETAILED DESCRIPTION OF THE PREFERRED EMBODIMENT

Figure 1:
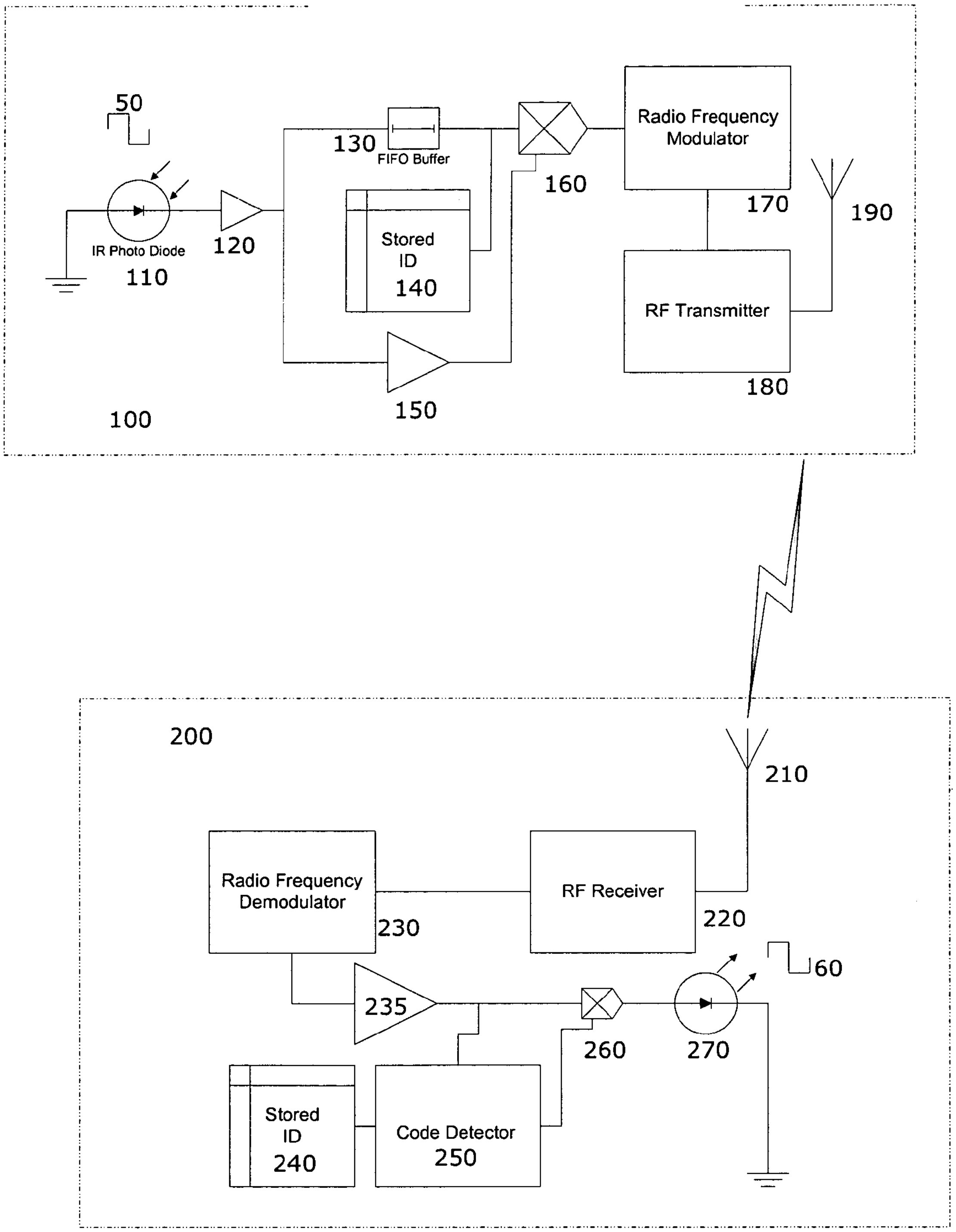
FIG. 1 is a diagram of the inventive aspects of the internal circuitry of the claimed apparatus.

Referring to the drawings in detail, and particularly to FIG. 1, the inventive aspects of the circuitry are described. According to one presently preferred embodiment, the invention comprises two distinct units: the transmitter 100, and the receiver 200. In this embodiment, the receiver 200 is placed adjacent to the controlled device or devices (for example, a television or VCR) to allow the photo emitter diode 270 and is in signal communication with the IR receiver of the controlled device. Similarly, the transmitter 100 is placed adjacent to the handheld IR remote control unit and is in signal communication with it. The range between the transmitter 100 and the receiver 200 may vary as a function of a variety of factors such as the frequency and power of the transmitter 100.

An IR photo detector diode 110 is the input device for the invention. The photo detector diode 110 receives a serial bit control signal 50 from the handheld remote control unit, generally an infrared control signal with a carrier frequency of between 10 and 75 kHz. Of course, any frequency range may be used consistent with this invention. Commercially available IR remote control units use several modulation schemes to encode IR commands to the controlled device. Because IR transmission characteristics vary greatly in intensity from the center of the beam to the edges, no practical modulations scheme will use amplitude modulation to define control signals.

The photo detector diode 110 acts as its own demodulator in any IR communications application. Infrared radiation is that class of electromagnetic radiation with a frequency of between $10^{12}$ and $10^{14}$ Hz. The photo detector diode 110 will only trigger in the presence of infrared radiation and, when triggered, passes a constant current. The latency of the diode smoothes adjacent sampled highs into a single pulse. Thus, the signal from the photo detector diode 110 amplified by the amplifier 120 to logical levels requires no further demodulation.

The presence of an incoming control signal triggers a signal detector 150 which sends a logical high to the multiplexor 160. Contemporaneously, the signal loads the First In First Out ("FIFO") buffer 130, where the buffer delays all or a portion of the signal just long enough to place an identification code stored within the code register 140 at the beginning of the control signal. The identification code might be stored at the code register 140 by any of several means. For instance, Dual In-Line Package ("DIP") switches can carry the code, as can EPROM chips, Flash ROM, or an array of digital latches. Often code registers may be registers within a micro-controller rather than discrete integrated circuits. These alternatives allow the transmitter 100 to be constructed with a single stored code or, alternatively, to allow the user to set the code from among a range of possibilities.

Thus, with each cycle of instruction sensed by the IR Photo Diode 110, the multiplexor 160 allows the annunciation of the stored identification code in the code register 140 and then draws the signal from the FIFO buffer, completing the augmented control signal. The multiplexor 160 then conveys the augmented control signal to an RF transmitter 170 for radiation through the antenna.

The augmented control signal is a digital signal. To transmit the augmented control signal, the transmitter 100 must impress that control signal onto a carrier signal of any suitable frequency. The augmented control signal passes through a modulator 170 for modulation. Modulation schemes for radio frequency ("RF") transmission of a digital signal use the carrier signal as a pulse train rather than to convey all of the additional information in a continuous analog stream. Any suitable scheme for transmission will use some form of pulsed carrier such as square pulses, or raised cosine pulses, or sync function (Nyquist) pulses.

The RF transmitter 180 is low-power radio systems commercially available from any of a number of manufacturers such as RF Monolithics, Inc., which typically transmit less than 1 milliwatt of power and operate over distances of 5 to 100 meters. In the case of chips from RF Monolithics, Inc., the modulator 180 is located on the chip. Thus, a digital signal input to the chip produces a modulated RF signal at the antenna. "On chip" modulation is not necessary for the invention. Because the science of radio transmission is well known, a manufacturer may readily use discrete components for modulation and demodulation of the RF signal. The transmitter is selected from such RF products as are certified to comply with local low-power communications regulations such that these systems do not require a license or "air time fee" for operation. At this point, the signal leaves the transmitter 100 through an antenna 190.

At an antenna 210, the augmented RF control signal enters the receiver 200. The antenna 210 conveys that augmented control signal to the RF receiver 220 selected from any of the compatible receivers from any of the same manufacturers that supplied the RF transmitter. As in the case of the transmitter, demodulation of the RF augmented control signal can occur on the chip where such chips are available, otherwise, demodulation occurs at a demodulator 230. In addition, as in the RF transmitter, a particular demodulation scheme is not necessary so long as the scheme matches the modulation scheme at the transmitter 100. From the RF receiver 220 and demodulator 230, an amplifier 235 boosts the voltage of the augmented signal to digital logic levels. A code detector 250 analyzes the inbound augmented control signal from the amplifier 230 and compares the code at the leading edge of the augmented control signal with that stored in a second code register 240, where an identification code is stored. If the code detector 250 determines that the received code is the same as the stored code, it sends a gating logical high to the multiplexor 260 that blanks that portion of the augmented control signal corresponding to the code and allows the remainder of the augmented control signal 60 to pass to the infrared photo diode emitter 270. As reconstructed, the remainder of the augmented control signal 60 should mimic the inbound control signal 50 at the transmitter. The infrared photo diode emitter 270 is in signal proximity to the infrared sensor on the TV, VCR, or other controlled device. The circuitry diagram shows one infrared photo diode emitter 270 for simplicity. Alternatively, a plurality of such photo diodes can be included to allow for the control of a plurality of such devices from a single transmitter 100 and receiver 200 pair.

FIG. 2 displays the several modulation schemes consumer electronics manufacturers exploit to effect remote control. FIG. 2*a* displays the simplest modulation scheme, the fixed-bit-time/full-width-burst. It is the analog to one-bit serial communication across a wire. A leading zero, however, will not trigger a response in the controlled unit. For this reason, rather than a simple on- or off-state, short bursts represent a zero and long bursts a one in the fixed-bit-time/modulated-burst-width as shown in FIG. 2*b*. To compress signals in time, the off time is made constant in the fixed-off-time-burst/width-modulated mode portrayed in FIG. 2*c*. Another variant on the fixed-bit-modulation scheme has either one or two narrow bursts to represent zero or one respectively, the fixed-bit-time/single-burst/double-burst modulation shown in FIG. 2*d*. This same scheme is compressed using a fixed off time as in the fixed off-time/single burst/double burst modulated scheme shown in FIG. 2*e*. Rather than modulate the burst time, the off-time is modulated in the fixed-burst-time/off-time-modulated scheme portrayed in FIG. 2*f*.

In each instance (FIGS. 2*a*–2*f*), there is a burst unit representative of the wavelength of the highest frequency digital signal present in the waveform, which is the building block of the digital signal. Shannon-Nyquist Sampling Theorem assures that sampling at a rate greater than twice the frequency of the highest frequency present in the control signal will assure the accurate capture of an IR control signal. As an example of this sampling, FIG. 2*g* demonstrates the accuracy of the sampling of the fixed burst time off-time modulated signal.

Figure 3:
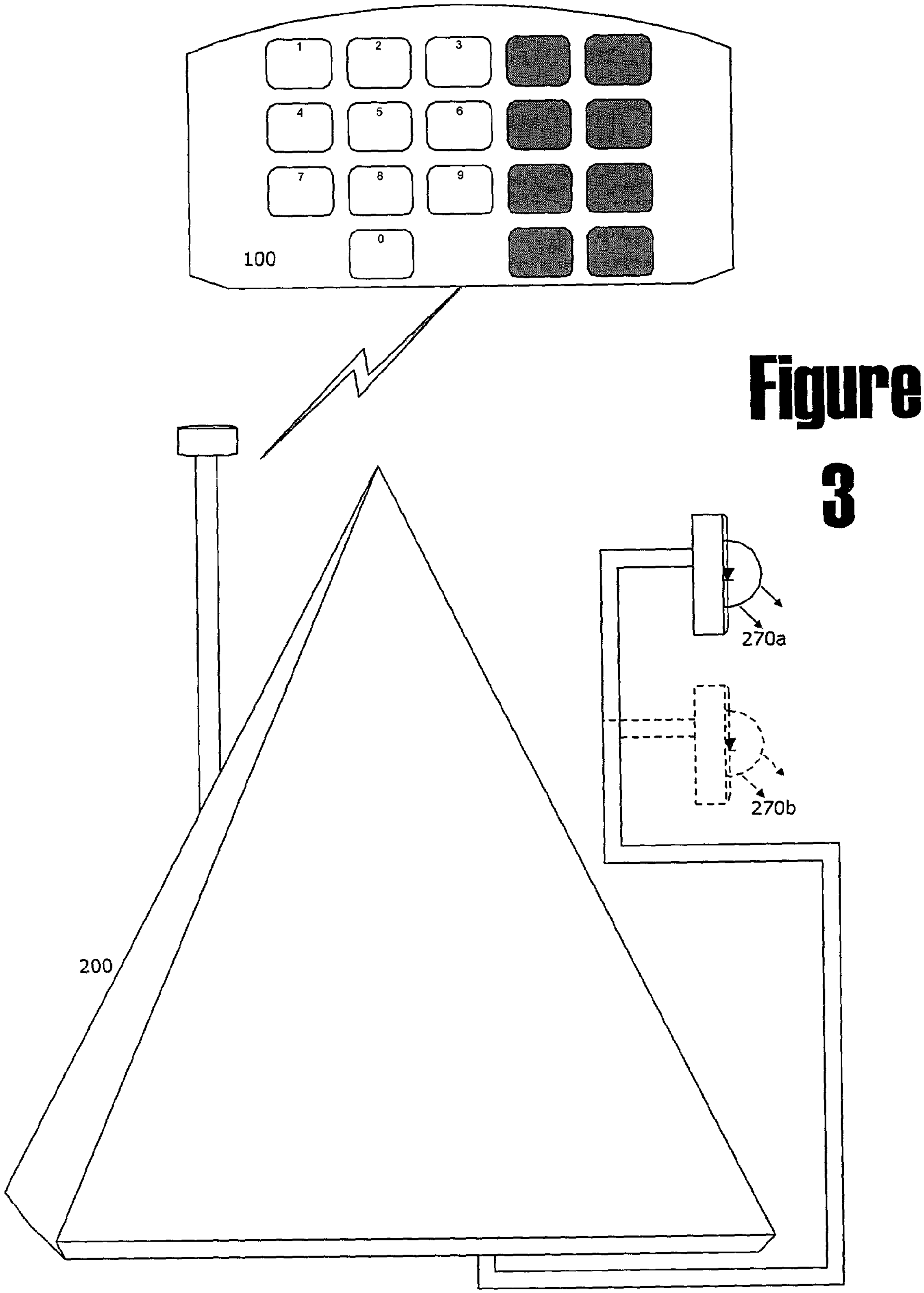
FIG. 3 is a drawing of an embodiment of the claimed apparatus in two units, including a transmitter and a receiver.

FIG. 3 portrays highly stylized depictions of the exterior of enclosures for the transmitter 100 and receiver 200, along with the attendant photo diode emitters 270. This FIG. 3 is included to assist in the interpretation of subsequent figures showing the placement and use of the invention. The shape of the enclosures as portrayed is not intended to limit the invention in any way.

Figure 4:
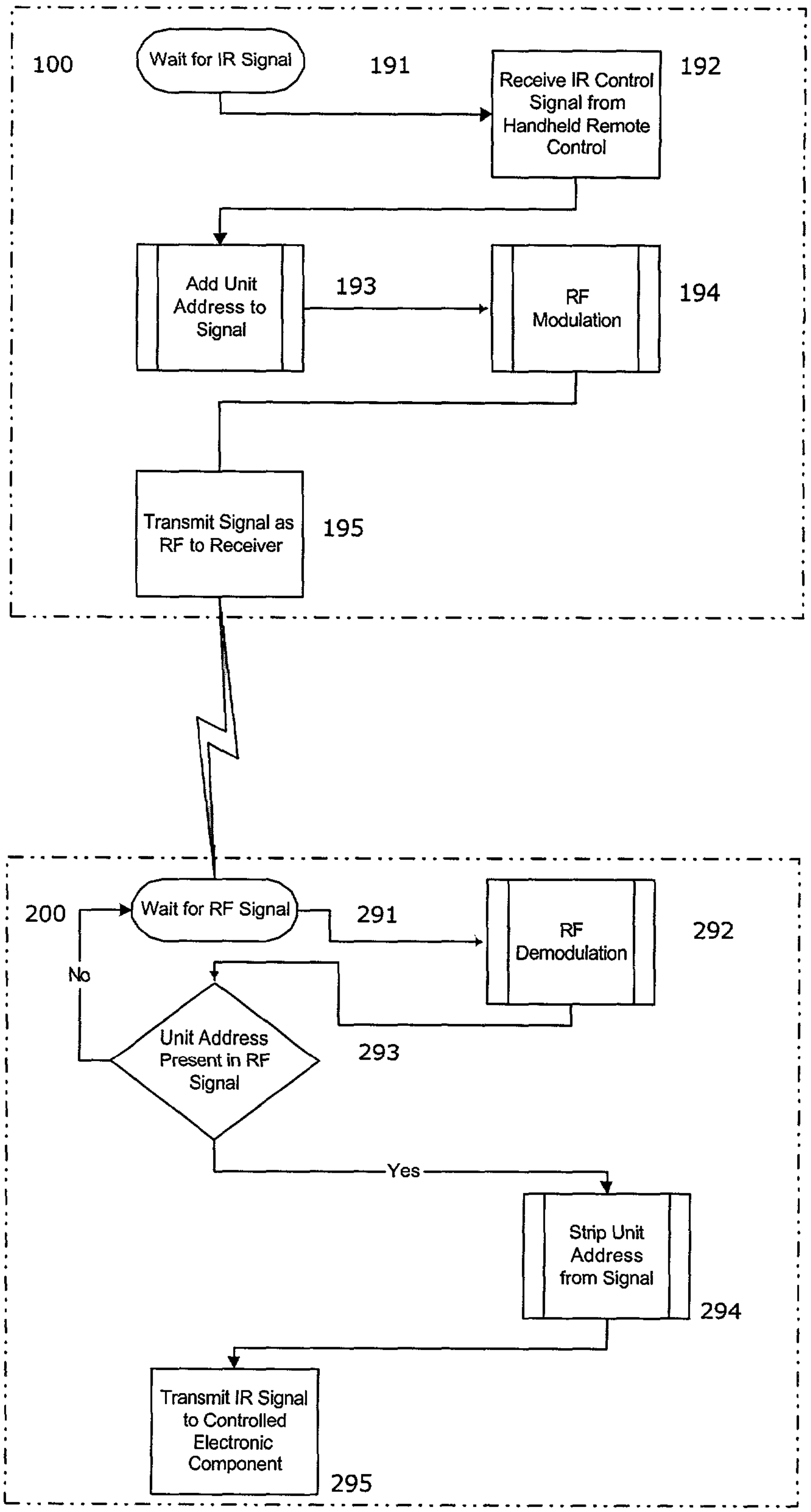
FIG. 4 is a flowchart depicting a preferred method for transmitting and receiving an addressed signal.

FIG. 4 is a flow chart depicting a preferred embodiment of the invention as it processes the control signals emitted from the handheld remote control unit supplied with the controlled device and its transmission to the controlled device. The transmitter 100 waits in a receptive state 191 for an inbound IR control signal. The photo detector diode 110 is responsive to the infrared control signals from the handheld remote control unit supplied with the controlled device in this receptive state.

Upon receiving an infrared control signal 192, the transmitter 100 converts the code to an electronic control signal, much as the controlled device would, in order to process the signal.

The receiver augments the infrared code signal by the addition of the programmed identification code 193. Augmenting, in the instance of the preferred embodiment, means placing the programmed electronic identification code at the leading edge of the control signal. Alternatively, the identification code may be placed at the trailing edge or embedded within the control signal. The signal might even be encrypted by an algorithm using the identification code as a key along with a confirmatory header within the control signal. The augmenting might not be distinct from the modulation step 194, for instance, the carrier frequency chosen by the transmitter may be a function of the programmed code in the code register 140. Any means of concatenating or embedding the identification code within the control signal may be used.

Once the transmitter 100 augments the control signal, it converts that electronic control signal to an RF signal in a process known as modulation 194 for transmission to the receiver 200. Generally, a transmitter 100 will transmit control codes over RF using UHF frequencies. The transmitter must impress the control code onto a carrier signal in the UHF band. Modulation may be by any of several means such as pulse width, serial data, pulse code, pulse position, or modulation by phase. Such modulation options are dictated by the choice of commercially available RF receivers and RF transmitters but no particular modulation or frequency ranges are required. Once modulation 194 occurs, the signal is transmitted 195.

The processing shifts to the receiver 200. Like the transmitter 100, the receiver 200 waits in a receptive state 291. The RF receiver 220 is responsive to control signals at the transmitted frequency and modulated by the appropriate means. The signal is, then, demodulated, i.e., the augmented control signal is distilled from the RF augmented control signals received at the receiver 220 in a process that is the inverse of that selected to modulate the augmented control signal at 194. After receiving and demodulating the signal, the receiver 200 checks the received signal for the presence of the identification code stored within the receiver 292. Unless the identification code is present, the receiver 200 returns to a receptive state 291. If the identification code is present, the receiver 200 treats the signal as an augmented control signal and then strips the code from the received augmented control signal 294.

Once the receiver 200 strips the identification code from the augmented signal, the remaining control signal should mimic that received at step 192. The receiver now at step 295 sends the control signal to the controlled electronic device by means of the photo emitter diode 270.

FIG. 5 depicts the transmitter 100 in the preferred embodiment as it is placed on a handheld remote control unit 10 supplied with a controlled device. Notable in this placement is the intentional occlusion and containment of the IR radiation from the handheld remote control unit's 10 photo diode emitter with respect to the controlled devices. This is a single embodiment. Alternate embodiments are possible. This placement of the transmitter achieves the important signal isolation of the handheld remote unit from the controlled devices in order to prevent redundant instructions by alternate transmission paths through and around the inventive device. Another embodiment would allow placement of the transmitter in close signal proximity to the handheld device and the occlusion of the photo detection diode on the controlled device to all IR radiation except that from the photo emitter diode 270 on the receiver 200. Such an embodiment might facilitate the placement of controlled devices in cabinetry that would normally prevent remote control of the devices by infrared means.

FIG. 6 shows the receiver 200 in signal communication with one or alternately two controlled devices. In practice, a receiver 200 will typically have two IR emitters 270—one, a high powered directional emitter and the other a wide angle to help to flood the room with IR signal energy (in fact, these receivers typically have more than two emitters to ensure that the room is flooded with IR signal energy). This redundancy is to insure that the positioning of the emitter in front of the equipment is not required. In addition, flooding the room with IR signal energy allows control of multiple devices with a single placement of the RF receiver. FIG. 6 portrays the installation for stereo racks, where a string of IR emitters 270*a* 270*b* on a cable allowing IR emitters 270*a* 270*b* affixed close to the IR receiver on the equipment. As discussed in the preceding paragraph, any placement of the photo emitter diode 270 must be in IR signal communication with the controlled device.

Figure 7:
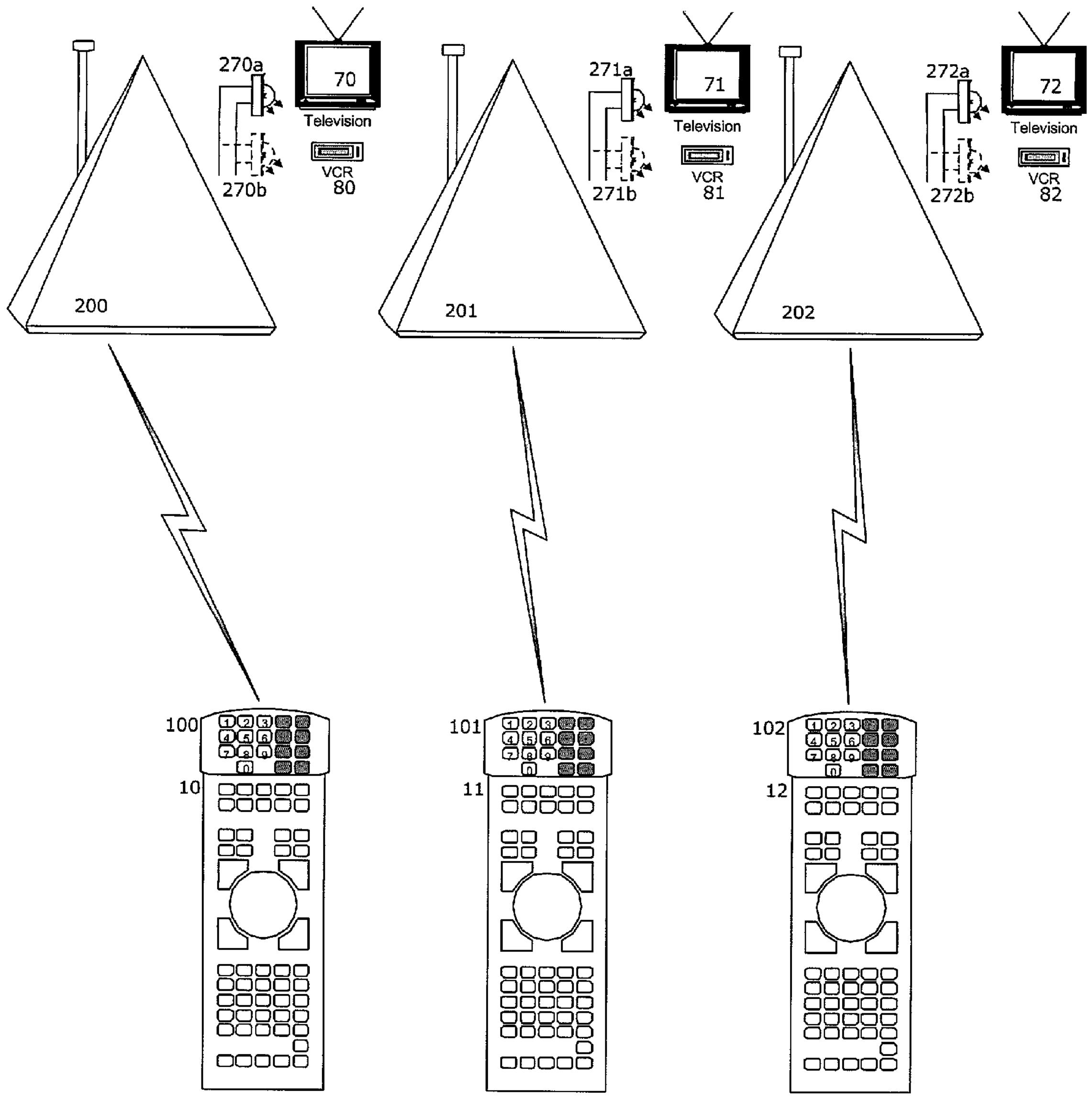
FIG. 7 portrays the use of a plurality of the inventive devices demonstrating the non-interfering use.

FIG. 7 depicts one of the advantages to the inventive system. If transmitter and receiver pairs 100, 200 have distinct identification codes from other adjacent pairs, the inventive system can be operated without fear of interference. Thus, a signal from a first transmitter 101 will be received by each of the receivers 200, 201, and 202. However, only the receiver 200 that has stored within it the same identification code as the first transmitter 100, will transmit a control signal to its controlled devices 71 and 81. The other receivers 201, 202 will disregard the received signal. This selectivity is not possible with the prior art transmitters.

Figure 8:
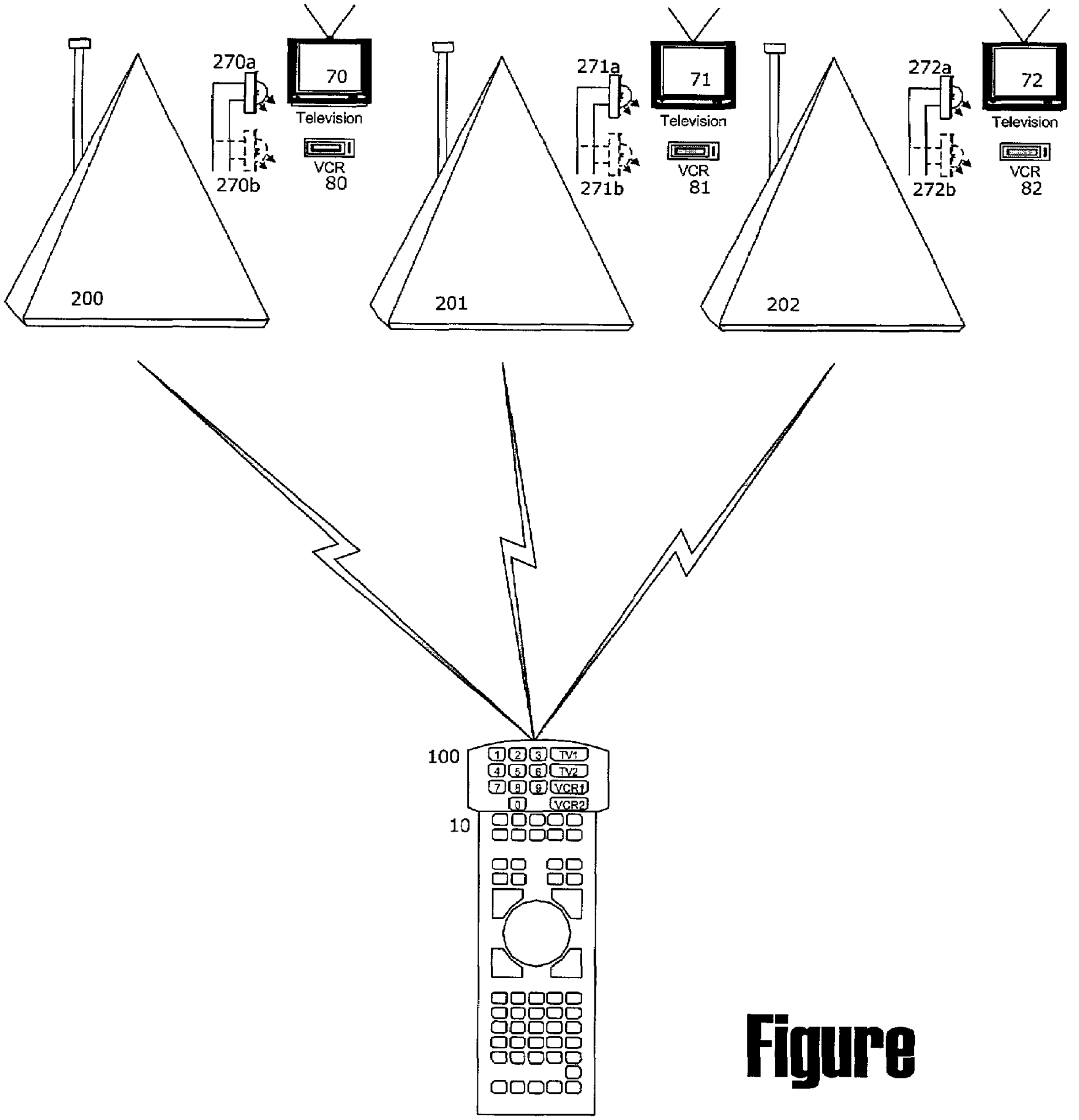
FIG. 8 portrays an alternate embodiment of the inventive device depicting the use of a single transmitter used to independently control a plurality of receivers; and, FIG. 9 portrays an alternate embodiment of the inventive device depicting the programming of the transmitter with a handheld IR remote control.

FIG. 8 depicts an alternate embodiment of the inventive device. In this embodiment, the transmitter 110 holds several identification codes. The user can designate a code through any of several means including a keypad, any form of switch, or by varying the input from the handheld remote control unit 10. Alternatively, the user can select buttons designated as TV1, TV2, VCR1, VCR2, or others. Once the user designates that code, the corresponding receiver 100, 101, or 102, as the case may be, responds to such control signals as the user may enter through the handheld remote control unit. This embodiment might be useful in auditoria, restaurants, or other such public halls where a plurality of controlled devices produced by the same manufacturer might be present. Without the instant invention, isolation of a single of these controlled devices for control would not be possible.

Figure 9:
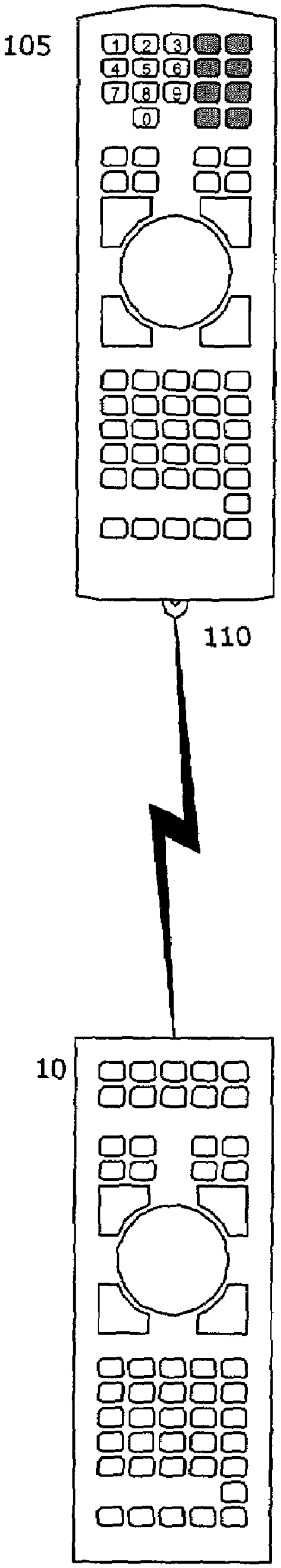

FIG. 9 depicts an alternate embodiment of the inventive device. In this embodiment, rather than to require activation of a handheld IR remote control 10 to execute a command, the transmitter 105 "learns" the vocabulary of the controlled device. The transmitter is set to "learn" mode. The operator designates a command on the transmitter 105 and then activates the corresponding command on the handheld IR. Like the preferred embodiment, the transmitter receives the IR control signal at the photo detector diode 110 and stores the received IR control signal in memory associated with the designated command. Once all commands are "learned," the transmitter 105 is placed in "use" mode. When the operator actuates a command on the transmitter 105, the associated control signal is drawn from memory just as the preferred embodiment would draw the signal from the buffer 130, and embeds the stored ID from the code register 140. Transmission of the augmented control signal occurs just as in the preferred embodiment. The same RF receiver 200 receives the RF augmented control signal and activates the controlled device in the same manner as in the preferred embodiment.

A further embodiment of the invention includes a database with codes for all controlled devices commercially available. A look-up table associates all of the control commands with data signals for each available controlled device. The operator associates each of the several controlled devices with a different one of the several controlled device buttons available on the RF transmitter 105. By associating a Brand X Model 10 television with the TV1 button, the operator has associated control signals with each function of the controlled device. When the operator actuates a controlled device button and then a command button on the transmitter 105, the transmitter draws the associated control signal from memory just as the preferred embodiment would draw the signal from the buffer 130, and embeds the stored ID signal from the code register 140. All of the remaining functions are as in the preceding embodiments.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A repeating radio frequency transmission system comprising:

(a) a transmitter capable of being placed in signal communication with an infrared remote control, the transmitter comprising:

(1) a detector configured to receive a first infrared control signal from the infrared remote control and generate a first electrical signal according to the first infrared control signal;

(2) a buffer coupled with the detector to store at least a portion of the first electrical signal;

(3) a first code register for storing a first identification signal;

(4) a multiplexor for combining the first electrical signal and the first identification signal into a first augmented electrical signal; and (5) a radio frequency transmitter responsive to the first augmented electrical signal for transmitting a radio signal representative of the first augmented electrical signal; and (b) a receiver capable of being placed in infrared control signal communication with a controlled device, the receiver comprising:

(1) a radio frequency receiver configured to receive the transmitted radio signal and for generating a second augmented electrical signal according to the received radio signal;

(2) a second code register for storing a second identification signal;

(3) a code detector for detecting the presence of the second identification signal within the second augmented electrical signal;

(4) a second multiplexor in communication with the code detector for removing the second identification signal from the second augmented signal, leaving a second electronic signal;

(5) an infrared emitter responsive to the second electronic signal for transmitting a second infrared control signal to the controlled device.

2. The repeating radio frequency transmission system of claim 1, wherein the first and second code registers are Dual Inline Package switches.

3. The repeating radio frequency transmission system of claim 1, wherein the first and second code registers are Read Only Memory.

4. The repeating radio frequency transmission system of claim 1, wherein the first and second code registers are logical latches.

5. The repeating radio frequency transmission system of claim 1, wherein the first and second code registers are Programmable Read Only Memory.

6. The repeating radio frequency transmission system of claim 5, wherein the identification signal is stored in code registers by actuation of user-controlled switches.

7. The repeating radio frequency transmission system of claim 5, wherein the identification signal is stored in code registers through actuation of user-controlled switches on the infrared remote control system.

8. The repeating radio frequency transmission system of claim 5, wherein the identification signal is stored code registers by downloading codes from a computer.

9. The repeating radio frequency transmission system of claim 1, wherein a plurality first identification signals are stored in the first code register.

10. The repeating radio frequency transmission system of claim 9, wherein actuation of user-controlled switches determines which of the plurality of first identification signals stored in the code registers is available to the multiplexor.

11. The repeating radio frequency transmission system of claim 10, wherein each of the plurality of identification codes are stored in one of the plurality of receivers.

12. The repeating radio frequency transmission system of claim 11, wherein the user controlled switches are labeled to correspond with the devices controlled by each of the one or more receivers.

13. The repeating radio frequency transmission system of claim 1, wherein a plurality of the first electrical signals are stored in the register.

14. The repeating radio frequency transmission system of claim 13, wherein each or the plurality of first electrical signals is associated with a distinct function of a controlled device.

15. The repeating radio frequency transmission system of claim 14, wherein each transmitter comprises a plurality of user-controlled switches for designating which of the associated first electrical signals is made available to the multiplexor.

16. The repeating radio frequency transmission system of claim 15, wherein a plurality of the first electrical signals are stored in association with a plurality of controlled devices.

17. The repeating radio frequency transmission system of claim 16, wherein each transmitter comprises a plurality of user-controlled switches for designating one of the plurality of controlled devices.

18. The repeating radio frequency transmission system of claim 1, wherein the transmitter is mechanically coupled to the infrared remote control.

19. A repeating radio frequency transmission system comprising:

(a) a transmitter capable of being placed in signal communication with an infrared remote control, the transmitter comprising:

(1) a detector configured to receive a first infrared control signal from the infrared remote control and generate a first electrical signal according to the first infrared control signal;

(2) a buffer coupled with the detector to store at least a portion of the first electrical signal;

(3) a first code register storing a first identification signal;

(4) a modulator to convert the first electrical signal to a first radio signal;

(5) a multiplexor for combining the first radio signal and the first identification signal into an augmented radio signal; and (6) a first antenna responsive to the augmented radio signal for transmitting the augmented radio signal; and (b) one or more receivers capable of being placed in infrared control signal communication with a controlled device, the receiver comprising:

(1) a second antenna to receive the augmented radio signal;

(2) a second code register for storing a second identification signal;

(3) a code detector for detecting the presence of the second identification signal within the augmented radio signal;

(4) a second multiplexor in communication with the code detector for removing the second identification signal from the augmented radio signal, leaving a second radio signal;

(5) a demodulator to convert the second radio signal to a second electronic signal; and (6) an infrared emitter responsive to the second electronic signal for transmitting a second infrared control signal to the controlled device.

20. The repeating radio frequency transmission system of claim 19, wherein the first and second code registers are Dual Inline Package switches.

21. The repeating radio frequency transmission system of claim 19, wherein the first and second code registers are Read Only Memory.

22. The repeating radio frequency transmission system of claim 19, wherein the first and second code registers are logical latches.

23. The repeating radio frequency transmission system of claim 19, wherein the first and second code registers are Programmable Read Only Memory.

24. The repeating radio frequency transmission system of claim 23, wherein the identification signal is stored in code registers by actuation of user-controlled switches.

25. The repeating radio frequency transmission system of claim 23, wherein the identification signal is stored in code registers through actuation of user-controlled switches on the infrared remote control system.

26. The repeating radio frequency transmission system of claim 23, wherein the identification signal is stored code registers by downloading codes from a computer.

27. The repeating radio frequency transmission system of claim 19, wherein a plurality first identification signals are stored in the first code register.

28. The repeating radio frequency transmission system of claim 27, wherein actuation of user-controlled switches determines which of the plurality of first identification signals stored in the code registers is available to the multiplexor.

29. The repeating radio frequency transmission system of claim 28, wherein each of the plurality of identification codes are stored in one of the plurality of receivers.

30. The repeating radio frequency transmission system of claim 29, wherein the user controlled switches are labeled to correspond with the devices controlled by each of the one or more receivers.

31. The repeating radio frequency transmission system of claim 19, wherein a plurality of the first electrical signals are stored in the register.

32. The repeating radio frequency transmission system of claim 31, wherein each or the plurality of first electrical signals is associated with a distinct function of a controlled device.

33. The repeating radio frequency transmission system of claim 32, wherein each transmitter comprises a plurality of user-controlled switches for designating which of the associated first electrical signals is made available to the multiplexor.

34. The repeating radio frequency transmission system of claim 33, wherein a plurality of the first electrical signals are stored in association with a plurality of controlled devices.

35. The repeating radio frequency transmission system of claim 34, wherein each transmitter comprises a plurality of user-controlled switches for designating one of the plurality of controlled devices.

36. The repeating radio frequency transmission system of claim 19, wherein the transmitter is mechanically coupled to the infrared remote control.

* * * * *